(12) United States Patent
Quinnan et al.

(10) Patent No.: US 8,757,821 B2
(45) Date of Patent: Jun. 24, 2014

(54) PROTECTIVE COVER FOR A TELESCOPIC DEVICE

(75) Inventors: Timothy Quinnan, Broomfield, CO (US); Brian Cavanaugh, Broomfield, CO (US)

(73) Assignee: The Allen Company, Inc., Broomfield, CO (US)

( * ) Notice: Subject to any disclaimer, the term of this patent is extended or adjusted under 35 U.S.C. 154(b) by 279 days.

(21) Appl. No.: 13/068,552

(22) Filed: May 13, 2011

(65) Prior Publication Data

US 2012/0127574 A1     May 24, 2012

Related U.S. Application Data

(60) Provisional application No. 61/395,413, filed on May 13, 2010.

(51) Int. Cl.
*G02B 23/16*     (2006.01)
*G03B 11/04*     (2006.01)
*B32B 3/04*     (2006.01)

(52) U.S. Cl.
USPC .......................................... 359/511; 428/127

(58) Field of Classification Search
USPC .................. 359/511–513; 428/123–127, 373; 385/102, 106, 153, 368; 338/238, 338/241–247
See application file for complete search history.

(56) References Cited

U.S. PATENT DOCUMENTS

| | | | | |
|---|---|---|---|---|
| 3,850,162 | A * | 11/1974 | Iglesias | 600/105 |
| 4,591,137 | A * | 5/1986 | Steinberg | 267/182 |
| 2002/0143237 | A1* | 10/2002 | Oneda et al. | 600/116 |
| 2008/0004571 | A1* | 1/2008 | Voss | 604/167.01 |
| 2010/0212709 | A1* | 8/2010 | Sotirkys et al. | 135/88.05 |

* cited by examiner

*Primary Examiner* — Thomas K Pham
*Assistant Examiner* — Brandi Thomas
(74) *Attorney, Agent, or Firm* — Boyd D. Cox

(57) ABSTRACT

The protective cover is for a telescopic device in which the cover can be stretched to fit over the device and then released to fit snugly around the device. The protective cover acts as an insulator to protect against temperature extremes, a barrier to protect against moisture, and a shock absorber to protect against external vibrations and impacts. Tabs facilitate the installation and removal of the protective cover.

1 Claim, 2 Drawing Sheets

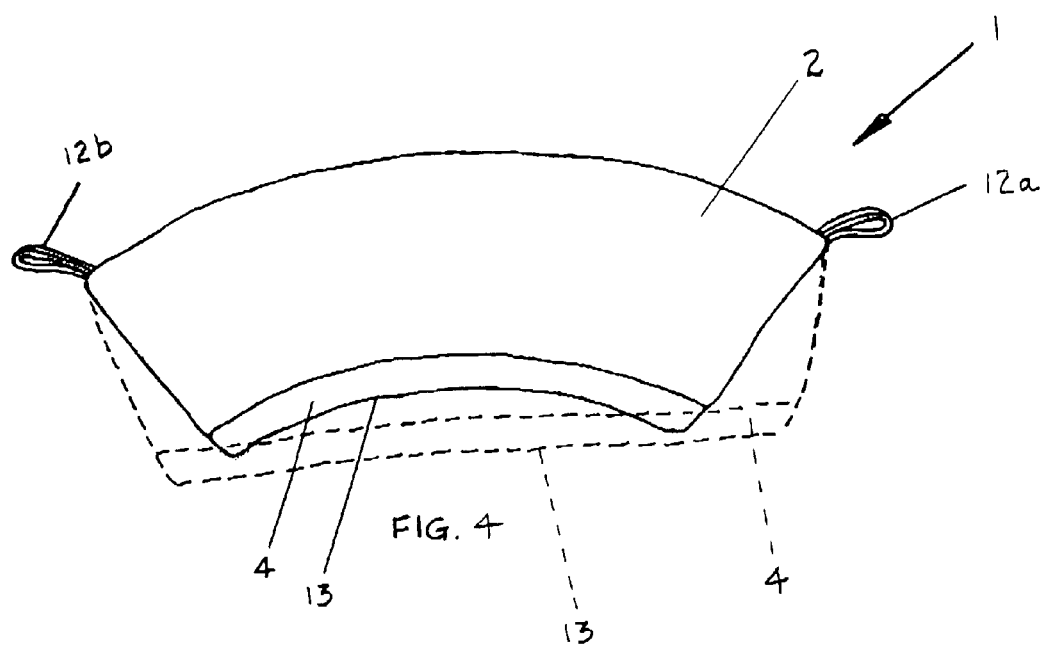
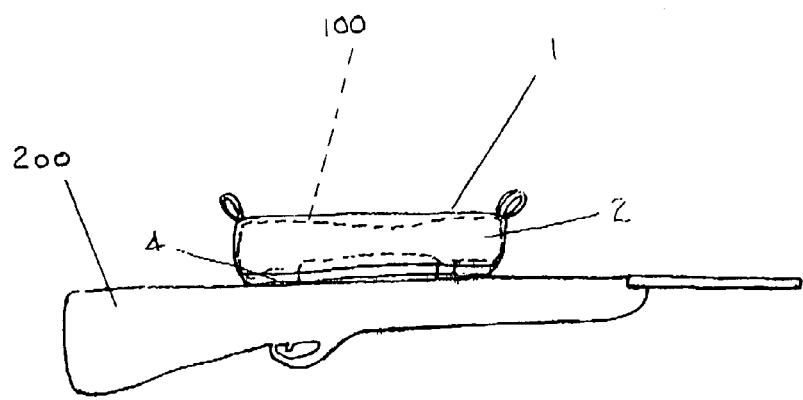

PROTECTIVE COVER FOR A TELESCOPIC DEVICE

Priority for this application is claimed from U.S. Provisional Application No. 61/395,413 entitled "Protective Cover For A Telescopic Device" filed on May 13, 2010

BACKGROUND

The present invention is directed to a protective cover for a telescopic device. The protective cover shields the device from dust, moisture and extreme temperatures and also insulates the device against external vibrations and impact.

A telescopic device, such as a sight or scope, is commonly used with a firearm such as a rifle or pistol to facilitate accurate sighting of a target. The device is generally mounted directly on the firearm and functions best when kept clean, dry and in proper adjustment.

In order to achieve accuracy when sighting a target, the telescopic device generally requires precise adjustment. Proper adjustment of the device can be adversely affected by external vibrations and/or impacts imparted to the device. When transporting a firearm, an attached telescopic device can be subjected to external vibrations and impact which can alter adjustments and/or damage the device.

The protective cover of the present invention is shock resistant and attenuates unwanted external vibrations and/or impacts. Therefore the cover insulates a covered device and shields it from damaging effects. By shielding the device, the cover assists in keeping the device in proper working order which can extend the life of the telescopic device.

Furthermore, dust, dirt and other particulate matter can easily get into parts of the telescopic device, resulting in abrasion and/or corrosion that can damage the device. The accumulation of dust on the lens can also reduce the effectiveness of sighting a target with the device. Consequently, it is often necessary to clean the lenses before using the device.

An exposed lens is also subject to getting scratched or cracked. A scratched or cracked lens diminishes the user's clarity of vision during use, thereby reducing the overall effectiveness of the telescopic device.

Therefore, there is a need for a protective cover for a telescopic device that can effectively inhibit entry and accumulation of particulate matter onto the device and can further protect the lenses against scratches.

When used outdoors, a telescopic device is frequently subjected to the vagaries of weather, including extreme temperature fluctuations, humidity and precipitation. Rapid temperature changes can alter the adjustment of sensitive instruments such as a scope or sight. This can result in a misalignment of the device. When misaligned, the device can fail to provide an accurate sighting of the target resulting in a poor aim and possibly a missed shot.

Therefore, there is a need for a protective cover for a telescopic device having insular capabilities to protect the device from significant temperature changes. In addition, a protective cover is needed that can inhibit precipitation and humidity from penetrating to the telescopic device.

A gun case for carrying a firearm and an attached telescopic device can generally accommodate and protect the device during transport and storage. However, a gun case is too cumbersome to carry in the field when hunting. Having to remove the firearm from the case in order to get off a shot would impede the hunter's ability to fire quickly if the opportunity arose. Consequently, firearms are typically carried in the field without a gun case, thereby leaving the telescopic device exposed to the weather and other potential damage.

With a protective cover such as the present invention that is lightweight, readily removable from a telescopic device and readily installed on the device, a user can have protection for his or her telescopic device without impeding the ease and quickness with which the firearm can be used.

In the prior art, lens caps are used to protect a telescopic device from damage. A lens cap typically attaches directly over the lens of a device and shields the lens against scratches and dust accumulation. However, the body of the telescopic device remains exposed and unprotected from extreme temperature changes, precipitation, humidity and impact. Consequently, a lens cap fails to protect the entire telescopic device by covering only the lenses.

Furthermore, each of the lenses on a telescopic device requires a separate lens cap for protection. Conventional telescopic devices require two lens caps, one to cover each of the lenses. Keeping track of the lens caps once they are removed from the device can be frustrating. Adding to the user's frustration, the lenses on a telescopic device are usually different sizes. This necessitates different sized caps for each lens, thereby making the task of replacing the caps on the proper lens both frustrating and time consuming. The user also must meet the daunting task of keeping track of the many lens caps after the caps have been removed.

Typically, a lens cap snaps on and off of the device's lenses. While this might simplify installation and removal of the lens caps, the caps can inadvertently detach from the device when removal is not desired. Such inadvertent removal can result in lost caps and subsequent damage to the exposed lens.

Therefore, the need exists for a protective cover that can be easily installed on a telescopic device and readily removed from the device. There is an additional need for a protective cover that can protect both of the device's lenses and the device's body from temperature changes, precipitation, humidity, dust, other particulate matter and physical damage.

The protective cover of the present invention is elastic and can stretch to fit various sizes and shapes of telescopic devices. Therefore, the protective cover can be used interchangeably on many of the various telescopic devices in an owner's collection.

When installed, the protective cover of the present invention surrounds most of the telescopic device, thereby providing protection for both of the lenses and the body of the device. During use, the cover protects the device from the damaging effects of the weather and environment and also provides insulation from external vibrations and impacts.

SUMMARY

The present invention is directed to a protective cover for a telescopic device wherein the cover can be stretched to fit over the device and then released to snap fit snugly around the device. The cover acts as an insulator to protect against temperature extremes, a barrier to protect against moisture, and a shock absorber to protect against external vibrations and impacts.

In addition, the protective cover is easy to install and remove. The cover's elasticity enables the cover to fit differently sized makes and models of telescopic devices, thereby providing a universally sized covering.

It is an object of the present invention to provide a protective cover that can shield both the lenses and the body of a telescopic device from external damage.

It is a further object of the present invention to provide a protective cover for a device wherein the cover has an elastic sheath that expands to fit over the device and is released to relax around the device, thereby securing the cover to the device.

It is a further object of the present invention to provide a protective cover for a telescopic device wherein the cover can draw moisture away from the device in order to protect it from water damage.

It is a further object of the present invention to provide a protective cover which shields a telescopic device from damage due to rain, condensation and/or spills.

It is a further object of the present invention to provide a protective cover that substantially surrounds the telescopic device.

It is a further object of the present invention to provide a protective cover that protects a telescopic device from extreme temperatures and temperature fluctuations.

It is a further object of the present invention to provide a protective cover that protects a telescopic device from humidity.

It is a further object of the present invention to provide a protective cover that can fit differently sized telesdopic devices.

It is a further object of the present invention to provide a protective cover having an elastically reinforced opening that securely retains the cover on a telescopic device and enhances the cover's durability.

It is a further object of the present invention to provide a protective cover for a telescopic device wherein the cover fits over the device and is held in place by an elastic portion.

It is a further object of the present invention to provide a protective cover that retains its original size and shape after sustained use.

It is a further object of the present invention to provide a protective cover with means for stretching the sheath and elastic portion to facilitate installation of the cover on the telescopic device.

It is a further object of the present invention to provide a protective cover with means for stretching the sheath and elastic portion to facilitate removal of the cover from the telescopic device.

It is a further object of the present invention to provide a protective cover with tabs for facilitating removal of the cover, while enhancing the cover's durability.

BRIEF DESCRIPTION OF THE DRAWINGS

Reference is made to the accompanying drawings in which are shown illustrative embodiments of the invention and from which novel features and advantages will be apparent.

FIG. 1 is a side view of the protective cover of the present invention shown to be installed on a telescopic device which is mounted on a firearm.

FIG. 4 is a side view of the protective cover of FIG. 1 shown in the relaxed state by the solid lines and shown in the expanded state by the dotted lines.

DETAILED DESCRIPTION

Figure 2:
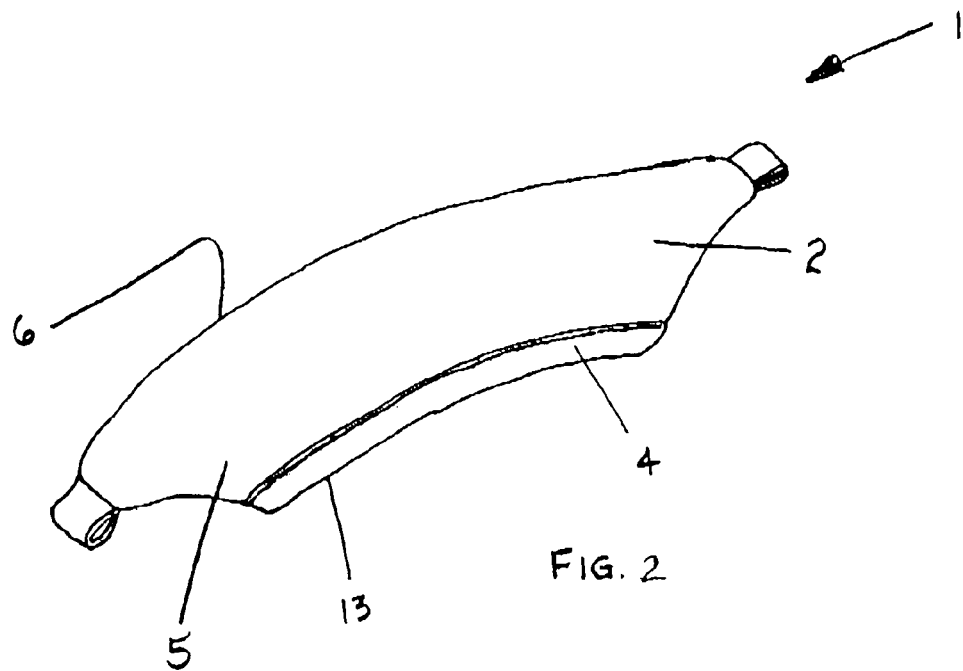
FIG. 2 is a top perspective view of the protective cover for a telescopic device as shown in FIG. 1.
Figure 3:
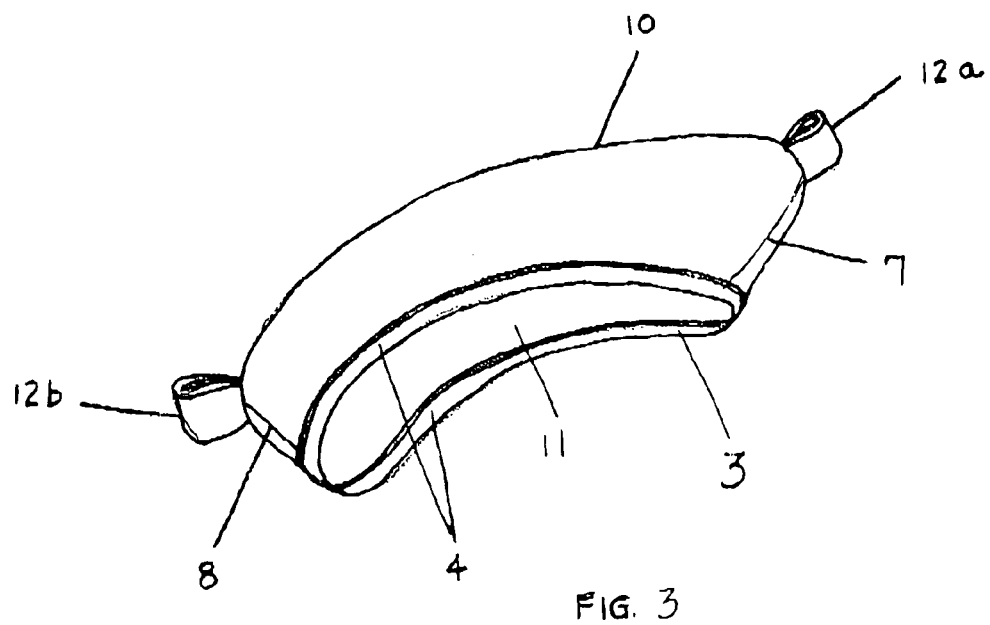
FIG. 3 is a bottom perspective view of the protective cover for a telescopic device as shown in FIG. 1.

Referring to FIG. 1, a protective cover 1 of the present invention is shown to be installed on a telescopic device 100 that is mounted on a firearm 200. The telescopic device 100 shown is commonly referred to as a sight or scope.

The protective cover 1 comprises a sheath 2, an elastic portion 4, and means for stretching the sheath and elastic portion to facilitate installation of the cover and to facilitate removal of the cover from the telescopic device.

The sheath 2 is a shell that forms an interior region 11 and has an opening 3 into the interior region 11. The sheath 2 further comprises first 5 and second 6 sides. The first 5 and second 6 sides of the sheath 2 are adjoined along a first edge 7, a second edge 8, and a top edge 10. A bottom edge 13 defines a perimeter of the opening 3 into the interior region 11.

The means for stretching the sheath and elastic portion comprise a pair of tabs 12a,12b. The tabs 12a,12b are disposed on the top edge 10 of the sheath 2 and enhance the durability of the cover 1. One of the tabs 12a is adjacent to the first edge 7 and the other tab 12b is adjacent to the second edge 8. Additionally, the tabs 12a,12b are disposed opposite to each other on the top edge 10 of the sheath 2.

The cover 1 includes a relaxed state and an expanded state. In the relaxed state shown by the solid lines in FIG. 4, the sheath 2 and elastic portion 4 of the cover 1 are at rest and neither is actively stretched. In this state, the sheath 2 of one preferred embodiment has a generally arcuate profile in which the top 10 and bottom 13 edges are somewhat curved and the top edge 10 is longer than the bottom edge 13.

In the expanded state, the sheath 2 and elastic portion 4 are stretched as shown by the dotted lines in FIG. 4. As the cover 1 is stretched, the bottom edge 13 approaches a length equal to the length of the top edge 10. Due to the elastic properties of the sheath 2, it can be appreciated that the bottom edge 13 could be stretched to a length equal to or greater than the top edge 10, if desired.

With the protective cover's elastic nature, the shape and size of the sheath 2 and elastic portion 4 can change as the cover 1 is stretched between the relaxed state and the expanded state.

In a preferred embodiment, the sheath 2 is made of neoprene and has a first modulus of elasticity. Neoprene comprises a stretchable material having an inner core of foam rubber flanked by outer nylon layers. At least one layer of nylon is disposed on each side of the foam rubber inner core. Although, neoprene is a preferred material, other suitable materials could be used instead of neoprene to comprise the sheath 2.

The elastic portion 4 surrounds the opening 3 of the sheath 2 and is comprised by an elastic band having a second modulus of elasticity. The first modulus of elasticity comprised by the sheath 2 is less than the second modulus of elasticity. Consequently, stretching or expanding the sheath 2 requires less force than expanding or stretching the elastic portion 4. This characteristic enables the elastic portion 4 to firmly secure the sheath's opening 3 around the base of a device 100 disposed within the cover 1, while allowing the sheath 2 to readily stretch in order to accommodate the device 100 held therein.

The means for stretching the sheath and elastic portion around the telescopic device comprise tabs 12a,12b. Each of the tabs 12a,12b is comprised by a loop made of nylon webbing that extends outwardly from the sheath 2. Although nylon webbing is preferred, other types of suitable materials could be substituted for the nylon webbing of the tabs 12a, 12b. Such substitutes could include nylon or polyester cord.

Referring to FIGS. 1 and 4, when the cover 1 is installed on a telescopic device 100, the sheath 2 extends around and over the device 100 and the elastic portion 4 holds the bottom edge 13 of the sheath 2 snugly around the base of the device 100. This snug fit created by the elastic portion 4 acts to hold the sheath 2 on the device 100 and also deters the entrance of dust and other particulate matter into the interior region 11 of the sheath 2.

The opening 3 provides access to the interior region 11 of the sheath 2 and the elastic portion 4 surrounds the edge 13 of the opening. During installation, the elastic portion 4 and sheath 2 are stretched to fit over the telescopic device 100. After the sheath 2 is fitted over the device 100, the tabs 12a,12b are released, thereby allowing the elastic portion 4 to contract around the base of the device 100 and allowing the sheath 2 to contract in and around the device 100. It is preferable that an amount of tension remain in the elastic portion 4 in order to hold the sheath's bottom edge 13 firmly against the device's base. Similarly, the sheath 2 may retain an amount of tension when covering the telescopic device 100.

The elastic portion 4 helps to secure the protective cover 1 in place on the device 100, further shielding against unwanted debris or moisture from entering the interior region 11 and damaging the device 100.

The tabs 12a,12b facilitate removal and installation of the protective cover 1 from a telescopic device 100 to enhance the durability of the cover. By grasping and pulling the tabs 12a,12b away from each other, a user can quickly remove the cover 1 from a device 100 without having to stretch the opening 3 any more than is necessary. By pulling the tabs 12a,12b, the opening 3 is expanded to an approximate smallest size that is required to slip the cover 1 off of the device 100. The tabs 12a,12b are used in a similar manner to install the cover 1 on a device 100. This deters overstretching and reduces the effects of fatigue on the elastic portion 4 surrounding the opening 3. By reducing fatigue and overstretching, the useable life of the elastic portion 4 and the protective cover 1 are extended.

With regards to the cover 1 of the present invention, the sheath 2 forms a shell which is adapted to surround and protect an enclosed telescope device 100. The opening 3 is defined by the bottom edge 13 of the sheath 2 and allows access to the interior region 11 formed by the shell. The elastic portion 4 surrounding the opening 3 reinforces the bottom edge 13 of the sheath 2. The resilient strength of the elastic portion 4 also acts to secure the bottom edge 13 of the sheath 2 around the base of the covered telescopic device 100.

Although the cover 1 is sized to fit conventional telescopic devices 100, its stretchable nature enables the cover 1 to be used with various sized devices 100. Since the cover 1 can fit a variety of differently sized telescopic devices 100, each cover 1 can be used interchangeably on a collection of varying telescopic devices 100. This enhances the versatility of the protective cover 1.

In one preferred embodiment, the elastic portion 4 is pretensioned during manufacture wherein a stretched elastic portion 4 is attached to a relaxed bottom edge 13 of the sheath 2. By attaching the stretched elastic portion 4 to the relaxed bottom edge 13, a slight gathered effect is created along the bottom edge 13 of the sheath 2 when the cover 1 is in the relaxed state.

With the bottom edge 13 of the opening 3 gathered by the elastic portion 4 as described, the elastic portion 4 can be expanded before the edge 13 of the bottom edge 13 of the sheath begins to stretch. This also allows the elastic portion 4 to fit securely around the base of the device 100 while providing ample room in the sheath's interior region 11 to encompass the device 100.

A perimeter of the elastic portion 4 is smaller in magnitude when the cover 1 is in the relaxed state than when the cover 1 is in the expanded state. Similarly, the perimeter of the opening 3 can vary in size, such that the opening is smaller when the cover 1 is in the relaxed state than when in the expanded state. In order to best accommodate the telescopic device 100 during installation, the cover 1 is stretched to an expanded state with the opening 3 and elastic portion 4 being stretched to receive the device 100 therein.

Both of the tabs 12a,12b are located along the top edge 10 of the sheath 2 and extend outwardly from the sheath 2. One of the tabs 12a is located adjacent to a first edge 7 of the sheath 2 and the other of the tabs 12b is located adjacent to the second edge 8 of the sheath 2. Therefore, the tabs 12a,12b are disposed at opposite ends of the top edge 10.

To install the protective cover 1 on a telescopic device 100, the cover 1 is preferably stretched and slipped over the device 100. Upon removal, the cover 1 is stretched and pulled off of the device 100 using the tabs 12a,12b as handles.

Specifically, the cover 1 is positioned in lengthwise alignment with the telescopic device 100 so that the bottom edge 13 of the sheath 2 is adjacent to a top side of the device 100 and the top edge 10 of the sheath 2 is directed away from the device 100. With the opening 3 near the telescopic device 100, the tabs 12a,12b are grasped and drawn apart thereby stretching the elastic portion 4 and sheath 2. The tabs 12a,12b are pulled apart until the opening 3 of the cover 1 is sufficiently expanded to fit around the device 100. The cover 1 is then drawn over and around the sides of the device 100 until the device 100 is substantially contained within the interior region 11 of the sheath 2 and the elastic portion 4 is proximate the base of the device 100. The tabs 12a,12b are then released, allowing the cover 1 to contract and move toward its relaxed state surrounding the device 100. With a tighter fit on the device 100, the cover 1 can remain in an expanded state after installation. With a looser fit, the cover 1 can return to a relaxed state.

Adjustments may be made to the position of the sheath 2 in order to assure that the cover 1 is evenly placed around the telescopic device 100 and that the elastic portion 4 is snugly secured around the base of the device 100.

To remove the protective cover 1 from a telescopic device 100, the tabs 12a,12b are grasped by the user and pulled in opposite directions to stretch the cover 1. As the elastic portion 4 is pulled outwardly, it is distanced from the base of the device 100 and the opening 3 is enlarged. When the opening 3 is large enough, the cover 1 is slipped off from one side of the device 100 and subsequently slipped off the other side of the device 100.

During use, the cover of the present invention shields the lenses and body of a telescopic device from dirt, moisture and extreme temperatures. The cover can be readily installed on a telescopic device that is mounted on a firearm and also quickly removed from the device when desired. The cover's elasticity gives rise to universal sizing and enables the present invention to be used with various sizes and models of telescopic devices.

Furthermore, the shock absorbent material of the sheath cushions the covered telescopic device against damage due to external vibrations and impact and insulates the interior region from extreme temperatures.

The tabs provide means for stretching the sheath and the elastic portion to facilitate installation and removal of the cover from a telescopic device without having to directly handle the elastic portion. By manipulating the cover using the tabs, the elastic portion is less subject to fatigue, thereby extending the useable life of the cover.

In addition, the elastic portion of the cover provides a tight fit between the bottom edge of the sheath and the base of the telescopic device. This tight fit holds the sheath firmly around the device, thereby inhibiting debris and moisture from entering the interior region of the sheath and protecting the covered device from resultant damage.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A protective cover for a telescopic device having a base attached to a firearm, the protective cover comprising:
   a shell-shaped sheath having an interior region;
   an elastic portion;
   a plurality of tabs for manipulating the cover;
   a relaxed state; and
   an expanded state;
   wherein:
   said sheath comprises first and second sides, first and second edges, a top edge, a bottom edge, and an opening, said opening being defined by the bottom edge of the sheath and in communication with the interior region;
   said sheath is a stretchable, cushioning material with insular qualities having a first modulus of elasticity;
   each of said plurality of tabs comprises a loop for grasping and pulling said cover, wherein one of said plurality of tabs is disposed at the first edge of the sheath and another of said plurality of tabs is disposed at the second edge of the sheath, both of said tabs are disposed at opposite ends of the top edge on the sheath and said tabs extend outwardly from said sheath;
   said elastic portion is disposed on the bottom edge of the sheath and at least partially surrounds the opening;
   said elastic portion further comprises a second modulus of elasticity; wherein said second modulus of elasticity is greater than said first modulus of elasticity, such that said sheath stretches more easily than said elastic portion;
   said elastic portion is pre-tensioned and gathers the sides along the bottom edge of the sheath proximate to the opening when the cover is in the relaxed state;
   when in said relaxed state, said sheath and said elastic portion are at rest whereby said sheath has a generally arcuate profile with an upper and lower arc defined by said top and bottom edges, respectively; and when in said expanded state at least one of said elastic portion and said sheath is stretched to include a tensile force therein;
   to install the protective cover on a telescopic device, said opening is aligned longitudinally with the telescopic device; said tabs are pulled in opposite directions, thereby stretching the protective cover and enlarging the opening; the enlarged opening is first placed over one end of the device and then placed over the other end; the sheath is pulled down over the device until the device is substantially contained within the interior region; the tabs are released allowing the elastic portion to contract around the base of the telescopic device thereby securing the cover to the telescopic device; and
   to remove the cover, the tabs are pulled in opposing directions to enlarge the opening; one of the first and second edges of the sheath is drawn up and away from the telescopic device; and the other of the first and second edges of the sheath is drawn up and away from the telescopic device, thereby freeing the cover from the telescopic device.

* * * * *